April 12, 1966   M. S. LIEBERMAN ETAL   3,246,089
ROLLER CONTACT STRUCTURE RESILIENTLY SUPPORTED
ON FLEXIBLE ARM FOR MEASURING FIN
ANGULAR DISPLACEMENT
Filed Dec. 31, 1963
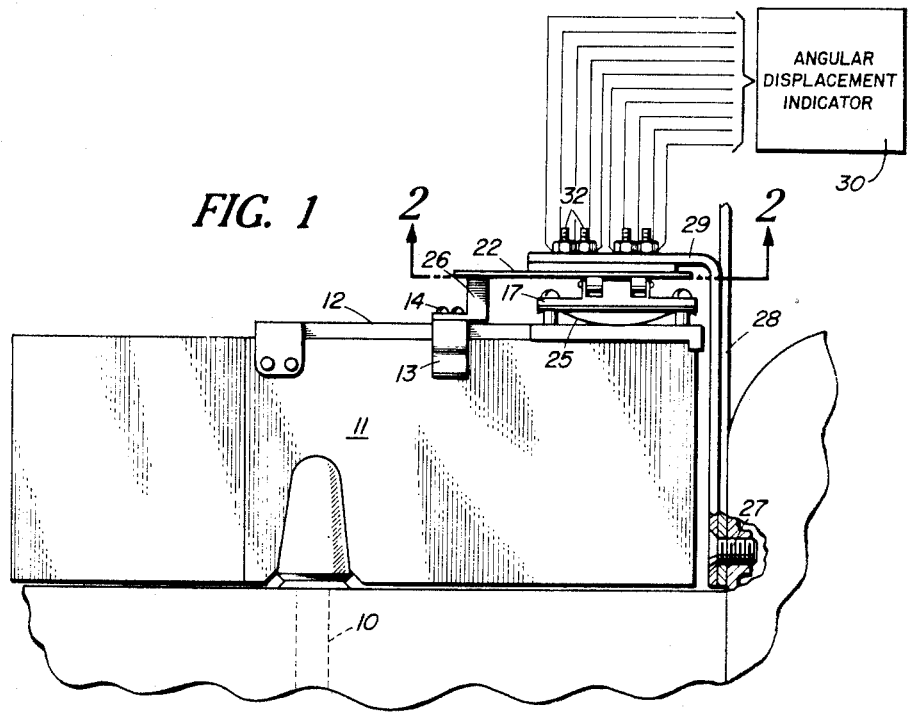
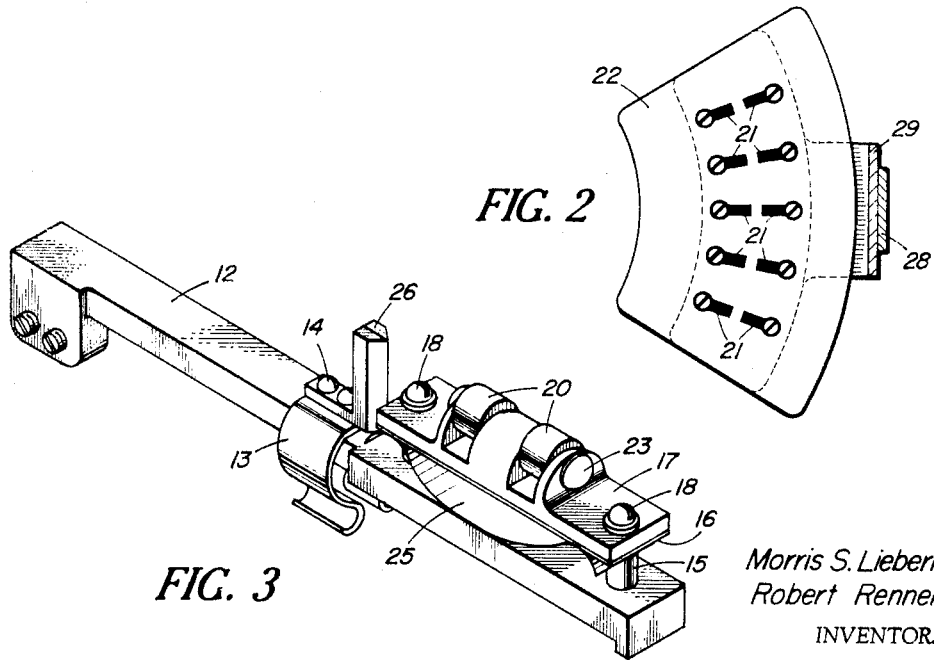
Morris S. Lieberman
Robert Renner
INVENTORS
BY Thomas O. Watson Jr.
ATTORNEY.

United States Patent Office 3,246,089
Patented Apr. 12, 1966

3,246,089
ROLLER CONTACT STRUCTURE RESILIENTLY SUPPORTED ON FLEXIBLE ARM FOR MEASURING FIN ANGULAR DISPLACEMENT
Morris S. Lieberman, Silver Spring, and Robert R. Renner, Hyattsville, Md., assignors to the United States of America as represented by the Secretary of the Navy
Filed Dec. 31, 1963, Ser. No. 334,950
4 Claims. (Cl. 200—11)

The invention described herein may be manufactured and used by or for the Government of the United States of America for governmental purposes without the payment of any royalties thereon or therefor.

The present invention relates generally to apparatus for measuring the angular displacement of a rotating body with respect to a reference position and more particularly to an electrical fixture for measuring the angular displacement of a guidance fin on a projectile while in simulated flight.

Prior art devices for measuring the angular displacement of a rotatable body have employed various mounting fixtures with a visual vernier type of indication. Various other electrical systems have also been used in combination with a rotatable shaft or the like to provide an electrical indication of angular displacement of the shaft. In this last-named category, the rotating shaft usually has notches, grooves, segments of electrically conductive or magnetic material or other surface irregularities thereon so that when the body is rotated, these variations or irregularities on the body's surface may be sensed by electrical circuit means adjacent thereto. For example, a flexible contact may be opened or closed as it passes into a groove on a shaft. A magnetic head may sense variations in surface magnetization at various angular positions on the surface of a rotatable body.

Although these devices have served the general purpose of measuring angular displacement of a rotatable body, they have not proved entirely satisfactory under all environmental conditions under which a rotatable body may be operating. Under conditions of shock or mechanical vibration these devices may be rendered inoperative due to a discontinuity in an electrical connection between the rotatable body and the sensing element or the sensing element and the indicator circuitry.

The present invention overcomes the aforedescribed disadvantages by providing an electrical fixture securable to the rotatable body and capable of maintaining forced mechanical coupling with electrical indicator circuitry to give a continuous indication of the angular displacement of said rotatable body. The apparatus of the present invention comprises a support member securable to said fin for rotation therewith and a bus bar having conductive rollers mounted thereon and conductively coupled thereto. This bus bar is flexibly mounted on said support member and spring biased away from one surface of said support member to restrain movement in a direction normal to that surface. The conductive rollers are biased into electrical contact with pairs of spaced conductive pads on a printed circuit plate immediately adjacent said bus bar. The rollers are adapted to engage the pairs of spaced conductive pads which form open terminals of electrical indication circuitry to provide a conductive path therebetween.

An object of the present invention is to provide an improved device for measuring the angular displacement of a rotatable body with respect to a fixed reference.

Another object is to provide a fin angular displacement measuring apparatus capable of operating under the most adverse conditions of shock or mechanical vibration.

A further object of the present invention is to provide a superior mechanical and electrical linkage between an electrical indicating circuit and a guidance fin on a projectile during simulated projectile flight.

A still further object is to provide a mechanical linkage between a rotatable guidance fin on a projectile and a stationary portion of the projectile whereby electrical circuitry fixedly mounted on said projectile may be energized to give an indication of the angular displacement of said fin.

Other objects and features of the invention will become apparent to those skilled in the art as disclosure is made in the following description of a preferred embodiment of the invention as illustrated in the accompanying sheet of drawing in which:

FIG. 1 is an elevational view, partly in section, of the fin alignment fixture mounted on the projectile guidance fin and a portion of the electrical indication circuitry fixedly mounted on a projectile;

FIG. 2 is a plan view of the contact plate assembly taken along lines 2—2 of FIG. 1; and FIG. 3 is an enlarged perspective view of the support arm and bus bar assembly in FIG. 1.

In FIG. 1 of the drawings there is shown a projectile guidance fin 11 rotatably mounted on the projectile by means of shaft 10. The fin alignment fixture of the present invention includes a support arm 12 which is secured to the fin 11 by a U-shaped spring member 13. Spring member 13 is fastened to support 12 by screws 14. The support arm 12 has extending therefrom a pair of insulated posts 15 upon which the bus bar 17 is slidably engaged and biased away from a surface of the support arm by spring 25. A rectangular insulating plate 16 is interposed between spring 25 and a bottom surface of the bus bar 17 and also slidably engages the insulated posts 15. Screws 18 engage each of the posts on the upper side of the bus bar 17 to enable only a limited movement of bus bar 17 in a direction away from the upper surface of support arm 12. A pair of conductive rollers 20 are mounted within cavities of bus bar 17 and carried by an axle 23 extending through a portion of the bus bar. Immediately adjacent and in forced contact with said rollers is an arcuate contact plate 22 having spaced pairs of conductive pads mounted thereon. Each pair of pads is spaced at a predetermined angular position on the bottom surface of the arcuate plate 22 with respect to a zero alignment or reference position. The arcuate plate 22 is fixedly mounted beneath L-shaped bracket 29 by screws 32. The L-shaped bracket 29 is secured to the projectile by screw 27 and a vertical support bracket 28 is interposed between the L-shaped bracket and the projectile. This support bracket may serve as a means for mounting an output connector for carrying electrical conductors from the pairs of conductive pads to electrical angular display indicator 30. The indicator may be any type of electrical indicator known to those skilled in the art, but preferably will be scaled in degrees of angular displacement from a reference position.

The support arm 12 may be secured to any portion of the fin 11 just as long as the rollers 20 are operative to engage the spaced conductive pads of the contact plate 22 as the fin is rotated on the fin support axis 10. By selecting a spring 25 with desired spring constants and by selecting a proper separation between the insulating plate 16 and the upper surface of support arm 12, the rollers 20 may be caused to move across the contact plate 22 with varying degrees of force. A visual vernier 26 is mounted on top of spring member 13 to enable one to visually align the rollers in the zero reference position, normally the outer pair of printed circuit pads.

The wires which lead from the respective pairs of conductive pads form the open terminals of electrical indication circuitry and provide a closed path to fin angular position indicators as the rollers engage the pairs of conductive pads spaced along the underside of contact plate 22 at various angular positions with respect to a zero alignment position. While the support arm 12 is designed to be secured to a fin, the electrical alignment feature of the present invention is not limited to this particular application. The spring loaded bus bar operable with the fixed contact assembly as shown may be designed for mounting on rotatable objects of various shapes without departing from the spirit and scope of this invention. Also the arcuate contact plate may be rotated while the bus bar remains in a fixed position. It is therefore to be understood that the foregoing disclosure relates only to a preferred embodiment of the invention. Numerous modifications or alterations may be made therein without departing from the spirit and scope of the invention as set forth in the appended claims.

What is claimed is:

1. Apparatus for indicating the angular displacement of a rotatable body with respect to a reference body comprising,
   an elongated support arm having means for securing said arm to a rotatable body,
   a bus bar having conductive rollers rotatably mounted thereon and conductively linked in series circuit to said bus bar,
   spring means interposed between said support arm and said bus bar for flexibly biasing said bus bar away from one surface of said support arm,
   contact plate means fixedly mounted on a reference body relative to said rotatable body and having spaced pairs of conductive pads spaced at angular intervals with respect to a reference position thereon for separately engaging said rollers when said rollers are yieldably urged into intimate contact with said plate means and caused to roll thereover upon rotation of said rotatable body,
   indicator means electrically coupled to each pair of spaced pads for indicating the angular displacement of said body when said rollers short circuit said pairs of pads.

2. The apparatus of claim 1 which further includes,
   a pair of insulated posts fixedly mounted on said support arm and extending laterally therefrom, said bus bar having a pair of openings therein for slidably engaging said posts,
   an insulating material interposed between and abutting said bus bar and said spring means for preventing electrical contact therebetween, said insulated member having a pair of openings therein for slidably engaging said posts,
   said rollers comprising a pair of spaced, coaxially aligned, rollers rotatably mounted on said bus bar and conductively coupled thereto.

3. Apparatus for indicating the angular displacement of a fin rotatably mounted on a projectile comprising,
   an elongated support arm having means securing said arm to a fin for rotation therewith,
   a bus bar having a pair of conductive rollers mounted thereon and conductively linked in series electrical circuit to said bus bar,
   means interposed between said bus bar and said conductive member for spring biasing said bus bar away from one surface of said support arm,
   a flat arcuate plate fixedly mounted on said projectile and lying substantially in the path of arcuate movement of one end of said fin,
   said plate having pairs of conductive pads spaced at predetermined angular positions along said path relative to a reference position and forming open electrical contact terminals, electrical indication circuitry connected to said terminals, whereby when said rollers are yieldably urged into intimate contact with said pairs of conductive pads upon rotation of said fin, the angular position of said fin may be determined.

4. The apparatus of claim 3 wherein,
   said rollers are mounted on said bus bar in spaced, coaxial alignment for rotation thereon,
   a pair of insulated posts fixedly mounted on said support arm and extending laterally therefrom for slidable engagement with said bus bar, and
   an insulating material interposed between and abutting said bus bar and said spring means for preventing electrical contact therebetween, said insulated member having a pair of openings therein slidably engaging said posts.

References Cited by the Examiner

UNITED STATES PATENTS

| | | | |
|---|---|---|---|
| 1,935,498 | 11/1933 | Bentley | 200—166 X |
| 2,273,245 | 2/1942 | Ander | 200—8 X |
| 2,418,616 | 4/1947 | Batcheller. | |
| 2,831,081 | 4/1958 | Macon | 200—8 X |
| 3,024,986 | 3/1962 | Strianese et al. | 340—282 |

KATHLEEN H. CLAFFY, *Primary Examiner.*

J. R. SCOTT, *Assistant Examiner.*